Patented Nov. 28, 1922.

1,437,155

UNITED STATES PATENT OFFICE.

FRANK R. SCHULZ, OF ST. LOUIS, MISSOURI.

LUTING COMPOSITION.

No Drawing.    Application filed August 18, 1921.   Serial No. 493,492.

*To all whom it may concern:*

Be it known that I, FRANK R. SCHULZ, a citizen of the United States, residing at the city of St. Louis, in the State of Missouri, have invented certain new and useful Improvements in Luting Compositions, of which the following is a specification.

This invention is a composition for stopping or sealing crevices between adjoining members or holes through material, and is adapted for use with wood, iron, or other material. It is particularly suitable for sealing cracks or the like in boats, although not primarily intended for calking purposes.

The ingredients of which this composition is preferably composed are white lead ground in oil and of a putty-like consistency and powdered cork in the proportions of eighty-five per cent (85%) of white lead to fifteen per cent (15%) of pulverized cork.

These ingredients are thoroughly mixed together by stirring, which will preferably be continued for approximately from fifteen to twenty minutes. The said ingredients will preferably be at atmospheric temperature while being so treated.

Minor changes may be made herein by varying the quantities of the said ingredients or their consistency or mode of admixture within the scope of the following claims.

I claim:

1. A composition of the character described comprising the admixture of white lead and ground cork in the proportions of about eighty-five per cent of the former and fifteen per cent of the latter.

2. A composition of the character described consisting of the admixture of white lead mixed with oil and ground cork, the former being present in a predominating quantity.

3. A composition of matter of the character described comprising the admixture of white lead ground in oil and ground cork in the proportions of 85% of the former and 15% of the latter.

In testimony whereof I hereunto affix my signature.

FRANK R. SCHULZ.